May 29, 1934. H. E. DOERR 1,960,302
WHEEL
Filed Nov. 19, 1932
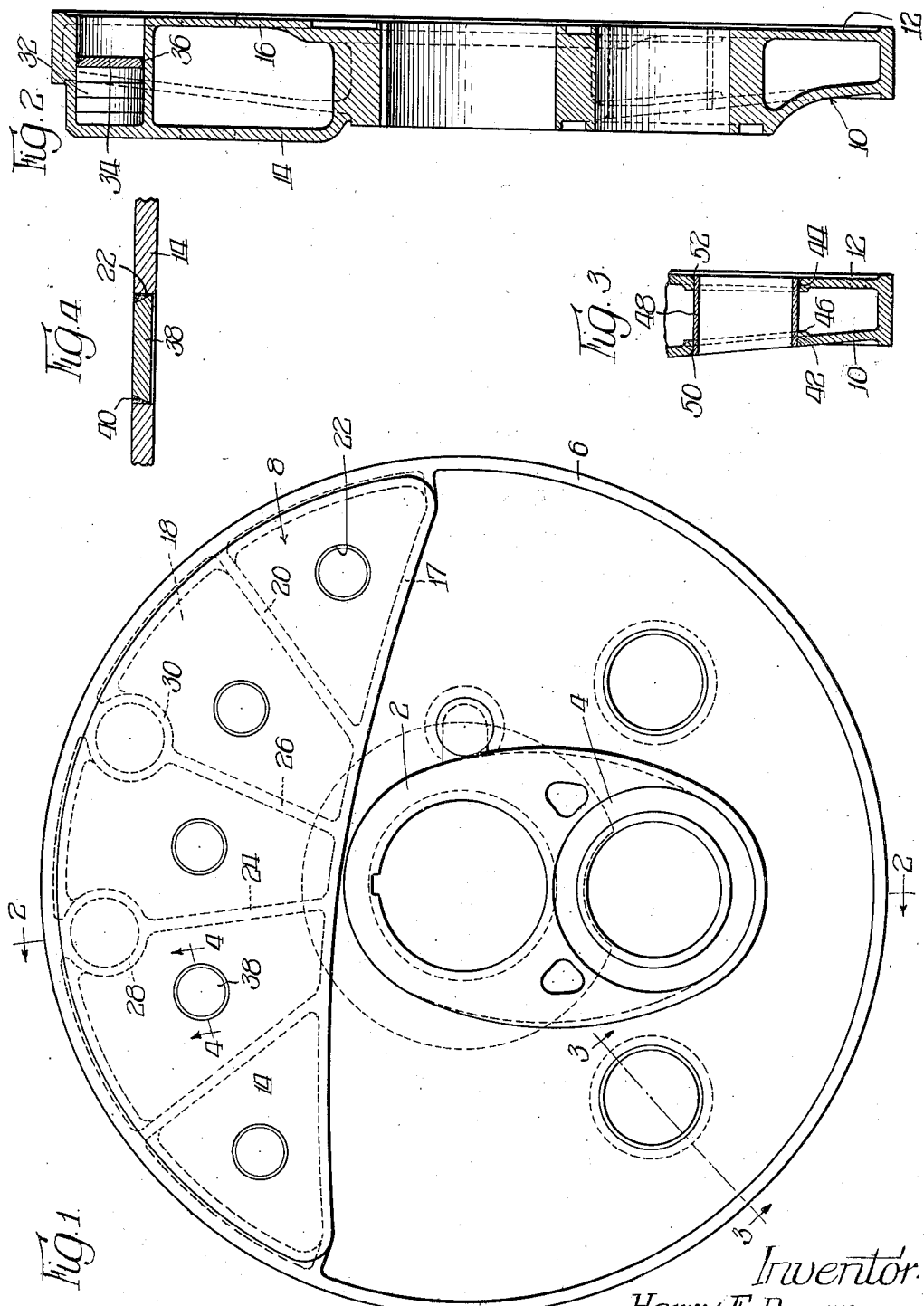
Inventor
Harry E. Doerr,
By Wilkinson, Huxley, Byron & Knight
Attys Patented May 29, 1934

1,960,302

UNITED STATES PATENT OFFICE 1,960,302

WHEEL

Harry E. Doerr, St. Louis, Mo.

Application November 19, 1932, Serial No. 643,321

12 Claims. (Cl. 295—6)

The present invention relates to wheels, and more in particular to wheels or wheel centers for locomotives or the like.

Among the objects of the present invention is to provide novel means in a locomotive wheel or other wheel, where it is necessary to have a counterbalance pocket for proper balancing of the wheel during rotation, for receiving additional counterbalancing material in order that pairs or groups of these wheels may be provided with substantially equal amounts of counterbalancing material.

At the present time, counterbalancing of locomotive wheels has been effected either by casting the counterbalancing portion integral with the wheel structure, or forming counterbalance pockets integral therewith which were later filled with a suitable counterbalancing material, in order to give the wheel the proper counterbalancing characteristics. It has been found, however, that where the counterbalance portion is cast integral, the weight of the counterbalance varies for different wheels, so that pairs or groups of these wheels operating in unison are not equally counterbalanced. Furthermore, in a locomotive wheel of this type, as well as in a locomotive wheel formed with counterbalance pockets for receiving counterbalancing material, the amount of counterbalance for these wheels is usually equal to an amount sufficient to balance certain given weights applied to or at the crank pin. However, in a series of locomotives of the same kind, or where a plurality of wheels is to be operated under similar conditions, there may be a considerable variation in the weights applied to or at the crank pin due to the fact that the design for the connecting rods for these wheels is occasionally changed. This variation in weights applied to or at the crank pin may amount to as much as 200 or 300 pounds, and it will be quite obvious from this wide variation in these weights that a given counterbalance portion or a counterbalance pocket completely filled with counterbalancing material could not be used to balance these variable weights applied to or at the crank pin. Also, it has been found impossible to either form these counterbalance portions of successive wheels of the same weight or to core the counterbalance pockets of two or more wheels to exactly the same dimensions. This inflexibility of the adaptation of these locomotive wheels for use under varying conditions can be well appreciated from the practical standpoint.

It is therefore an object of the present invention to provide novel means in a locomotive wheel or the like whereby two or more wheels may be formed with counterbalances substantially of equal weight so as to balance substantially equal weights applied to or at the crank pin therefor.

Still another object of the present invention is to provide a novel wheel for a locomotive or the like, wherein the counterbalance therefor may be varied in accordance with the requirements whereby one or more of these wheels operating under similar conditions may be counterbalanced substantially equal amounts.

The present invention comprehends the idea of forming a wheel for a locomotive or the like in which a suitable recess or the like is provided in the counterbalance pocket or portion normally provided for the purpose of receiving additional counterbalancing material, should this material be needed to counterbalance the wheel under given conditions. More particularly, the present invention comprehends the idea of providing such novel means for receiving additional counterbalancing material whereby a plurality of wheels operating under given conditions may be counterbalanced to substantially the same amount.

Still another object of the present invention is to provide a novel wheel for a locomotive or the like in which one or more of these recesses are formed in association with the counterbalance pocket or portion for receiving additional counterbalancing material, suitable closure means being provided which is adapted to be adjusted into close association with varying quantities of this additional counterbalancing material, and secured in place to hold this additional counterbalancing material securely and to prevent its movement during operation of the wheel or wheels.

Still a further object of the present invention is to provide a novel wheel for a locomotive or the like which includes spaced webs or discs extending between the hub and rim portions thereof, these webs being formed with aligned openings for removal of core forming material and normally closed as by means of a member disposed within these openings and secured to the webs.

The present invention also includes as an object the idea of providing a separate member insertable within the aligned openings in the webs and securing the same to these webs, as by means of welding or the like, this member in an embodiment disclosed to illustrate the invention comprising a tubular pipe member insertable in place after removal of the core forming material and being secured to these webs by welding or the like.

Other objects, features, capabilities and advantages are comprehended by the invention, as will later appear and as are inherently possessed thereby.

Referring to the drawing:

Figure 1 is a view in elevation of a locomotive wheel or center made in accordance with the present invention;

Figure 2 is a view in cross section taken in the planes represented by line 2—2 of Figure 1 of the drawing;

Figure 3 is a fragmentary view in cross section taken in the plane represented by line 3—3 of Figure 1 of the drawing; and Figure 4 is a fragmentary view in cross section of one of the walls of the counterbalance pocket and taken in a plane represented by line 4—4 of Figure 1 of the drawing.

Referring now more in detail to the drawing, an embodiment selected to illustrate the invention comprises a locomotive wheel center formed with a main hub 2 and a crank pin hub 4 integral therewith and adapted to receive a crank pin pressed therein or secured in place in any other desired manner. This wheel further includes an integral rim portion 6 and a counterbalance portion 8, spaced webs 10 and 12 extending between the hub portions 2 and 4 and rim portion 6, as well as between the hub portions and the counterbalance pocket 8.

In the illustrative embodiment disclosing the invention, the counterbalance pocket 8 is formed with spaced webs 14 and 16 merging at their outer periphery with a portion of the rim 6, while their inner marginal edges merges with a transverse wall portion 17 which extends transversely between the webs or discs 10 and 12 and extends outwardly beyond the same. This counterbalance pocket 8 is sub-divided into a plurality of individual compartments, such as 18, as by means of a plurality of partitions 20 comprising walls extending substantially radially in relation to the axis of the main hub 2 and between the transversely disposed wall portion 17 and the rim portion 6. These partitions of course extend in a transverse direction between the webs 14 and 16 which form the outer faces of the counterbalance pocket 8, thereby providing a plurality of compartments 18 completely segregated from one another and each of which is accessible only by way of openings 22 provided in the webs or discs 14 and 16.

In fabricating these locomotive wheel centers or the like and applying them to an axle for use in a locomotive, the wheels are cast integral as disclosed, and the rims, bore and face of hubs are machined, the main hub 2 being machined to receive the supporting axle, while the crank pin hub 4 is machined for receiving the crank pin. The rim 6 is machined for receiving a flanged tread or the like, although it will be readily appreciated that the present invention includes the idea of integrally forming this flanged tread with the rim portion. The present invention is therefore of such a scope as to comprehend this alternative construction, and in the present disclosure and claims, the term "wheel" is to be understood as referring to either of these two types of construction.

After the wheels have been machined as described, the counterbalancing material is poured through the openings 22 into the compartments 18. This counterbalancing material is preferably lead or some other weighty material which may be conveniently poured in its molten condition so as to conform to the interior walls of the compartments 18 upon solidifying. After this molten lead has become cold, a conical wedge is driven into the same through the openings 22. This conical wedge spreads the lead apart so that it completely fills the pocket and does not vibrate when the locomotive is running. The conical holes driven into the body of cold lead are then filled with molten lead and allowed to become cold, this second pouring of lead completely filling the compartments 18.

The crank pins for these wheels are next pressed into the opening of the crank pin hubs, after which a locomotive wheel is pressed onto each end of the axle for supporting the same. The pair of wheels, as in the case of a locomotive, is then ready for counterbalancing. This is accomplished by mounting the pairs of wheels on suitable roller bearings under the axle, and the required weights applied to the crank pin of one of the wheels and then to the crank pin of the other of the wheels to determine whether or not sufficient counterbalance for these wheels has been provided. In actual practice, it is desirable to so construct the counterbalance pocket 8 that the counterbalance will be a little light and require further counterbalancing material.

The present invention comprehends the idea of so constructing the counterbalance pocket 8 that this counterbalancing material may be applied to and placed in position conveniently and quickly so as to secure the proper counterbalancing effects for wheels of a given type and construction so that pairs of these wheels may be equally counterbalanced. In the present embodiment, the locomotive wheel center is shown with two centrally disposed partition members 24 and 26 corresponding to the partition members 20, each of these members being provided with a substantially cylindrical recess portion 28 and 30 constituted by oppositely disposed portions to provide space for receiving this additional counterbalancing material. Each of these recess portions is closed at one end by a portion of the web 14, while the other end is opened on the other face of the wheel to provide for the introduction of this counterbalancing material.

After the wheels have been mounted upon opposite ends of an axle as above described, it would not be practical to pour molten lead or the like into the pockets or chambers 18 in order to counterbalance these wheels to a given amount. On the other hand, the openings to the recesses formed by the cylindrical portions 28 and 30 of the partition members 24 and 26, respectively, are easily accessible, and the proper counterbalancing of these wheels may be easily and readily effected by introducing a plurality of pre-cast discs 32 of lead into these recesses, as disclosed in Figure 2 of the drawing. These pre-cast discs of counterbalancing material are preferably formed so as to weigh about five pounds each and are introduced one at a time until the wheel is counterbalanced a suitable amount. When sufficient counterbalancing material has been added to offset or balance the weight applied to the crank pin, the opening to the cylindrical portions 28 and 30 may be closed by a plug or closure member 34 which is moved into contiguous surface relation with the last added disc of counterbalancing material, and is then welded in place by the welded joint 36. Plates or closure members 38, as shown in Figure 4 of the drawing, may likewise be welded as at 40 within the openings 22 of the web 14 in order to prevent access of foreign matter within the chambers 18 of the counterbalance pocket 8.

From the above, it will be clearly apparent that counterbalancing material of a sufficient approximate quantity may be introduced into the chambers 18, and the final counterbalancing of the wheels to minute variations effected by the introduction of the pre-cast blocks of additional counterbalancing material 32, as shown. In this way, two wheels disposed at opposite ends of an axle may be equally counterbalanced within very slight variations, whereby they will then operate to effect the results desired.

As disclosed in Figure 3 of the drawing, the webs or discs 10 and 12 may be formed with one or more openings 42 and 44 substantially in alignment, and reinforced as by means of the bossed or thickened inwardly extending flanges 46 to provide means whereby core forming material may be removed from the chamber formed therebetween. After this core forming material has been removed, and to prevent entrance of foreign material into the opening between these discs or webs, the aligned openings are closed or partitioned from their communicating relation with this chamber between the webs 10 and 12 as by means of a member 48, which, in the embodiment disclosed, comprises a piece of tubular pipe or the like and which is cut flush with the surfaces of the discs 10 and 12. This tubular pipe is secured in place as by means of the welded joints 50 and 52 between the end portions thereof, and the webs 10 and 12, respectively, thereby effectively preventing access of foreign material to the cavity formed between the webs 10 and 12 when the core forming material is removed.

While I have herein described and upon the drawing shown an illustrative embodiment of the invention, it is to be understood that the invention is not limited thereto but may comprehend other constructions, arrangements of parts, details and features without departing from the spirit of the invention.

I claim:

1. A wheel for a locomotive or the like, comprising a member provided with a counterbalance pocket for receiving a given quantity of counterbalancing material, said pocket being provided with a partition wall having portions in spaced relation to provide a recess in said pocket for receiving additional counterbalancing material necessary to properly counterbalance said wheel.

2. A wheel for a locomotive or the like, comprising a member provided with a counterbalance pocket, substantially radially disposed partition members for said pocket, said partition members having portions in spaced relation to provide recesses for receiving additional counterbalancing material to properly counterbalance said wheel.

3. A wheel for a locomotive or the like, comprising a member provided with a counterbalance pocket, substantially radially disposed partition members for said pocket, said partition members having portions in spaced relation to provide recesses for receiving additional counterbalancing material to properly counterbalance said wheel, said recesses having an opening for access thereto, and adjustable closure means for securely holding varying quantities of additional counterbalancing material in place.

4. A wheel for a locomotive or the like, comprising a member provided with a counterbalance pocket, substantially radially disposed partition members for said pocket, said partition members having portions in spaced relation to provide recesses for receiving additional counterbalancing material to properly counterbalance said wheel, said recesses having an opening for access thereto, and a closure member fitting said opening and adjustable in said recess for securely holding varying quantities of additional counterbalancing material in place.

5. A wheel for a locomotive or the like, comprising a member formed with a rim portion, a counterbalance pocket adapted to hold counterbalancing material and having oppositely disposed walls terminating in said rim portion, substantially radially disposed partition members between said walls and terminating in said rim portion, said partition members having portions disposed in spaced relation to provide a recess for receiving additional counterbalancing material, said wheel having an opening for access to said recess, and a closure member for said opening.

6. A wheel for a locomotive or the like, comprising a member formed with a rim portion, a counterbalance pocket adapted to hold counterbalancing material and having oppositely disposed walls terminating in said rim portion, substantially radially disposed partition members between said walls and terminating in said rim portion, said partition members having portions disposed in spaced relation to provide a recess for receiving additional counterbalancing material, one of said walls having an opening for access to said opening, and a closure member adjustable in said recess and secured to the walls thereof for holding a desired quantity of additional counterbalancing material in place.

7. A wheel comprising a member provided with a counterbalance pocket having oppositely disposed walls, and a recess provided in said pocket and having an opening formed in a wall of said pocket for receiving additional counterbalancing material.

8. A wheel comprising a member provided with a counterbalance pocket having oppositely disposed walls, a recess provided in said pocket and having an opening formed in a wall of said pocket for receiving additional counterbalancing material, and a closure member fitting within said recess for closing said opening.

9. A wheel comprising a member provided with a counterbalance pocket having oppositely disposed walls, and a recess provided in said pocket, said recess having a wall extending between said first-named walls and provided with an opening in one of said first-named walls.

10. A wheel comprising a member provided with a counterbalance pocket having oppositely disposed walls, a recess provided in said pocket, said recess having a wall extending between said first-named walls and provided with an opening in one of said first-named walls, and a closure member fitting within said recess for closing said opening.

11. A wheel comprising a member having a rim and a counterbalance pocket provided with oppositely disposed walls, one of said walls comprising a part of said rim, and a recess provided in said pocket, said recess having a wall disposed in said pocket and being provided with an opening in one of said walls of said member.

12. A wheel comprising a member having a rim and a counterbalance pocket provided with oppositely disposed walls, one of said walls comprising a part of said rim, a recess provided in said pocket, said recess having a wall disposed in said pocket and being provided with an opening in one of said walls of said member, and a closure member fitting within said recess for closing said opening.

HARRY E. DOERR.